United States Patent
Umi et al.

(10) Patent No.: US 8,760,678 B2
(45) Date of Patent: Jun. 24, 2014

(54) IMAGE DISPLAYING APPARATUS, IMAGE DISPLAYING METHOD, AND IMAGE DISPLAYING PROGRAM FOR DETECTING AND DISPLAYING MULTIFEED

(75) Inventors: Kazuaki Umi, Ishikawa (JP); Tadashi Niwano, Ishikawa (JP); Shinji Suzuki, Ishikawa (JP)

(73) Assignee: PFU Limited, Ishikawa (JP)

( * ) Notice: Subject to any disclaimer, the term of this patent is extended or adjusted under 35 U.S.C. 154(b) by 54 days.

(21) Appl. No.: 13/043,937

(22) Filed: Mar. 9, 2011

(65) Prior Publication Data
US 2011/0279849 A1 Nov. 17, 2011

(30) Foreign Application Priority Data
May 14, 2010 (JP) ................................. 2010-112444

(51) Int. Cl.
*G06K 15/00* (2006.01)

(52) U.S. Cl.
USPC ............. 358/1.14; 358/498; 271/91; 271/8.1; 271/121; 271/122; 271/123

(58) Field of Classification Search
CPC ............ H04N 1/0044; H04N 1/00453; H04N 1/00461; H04N 1/00474; H04N 1/00588; H04N 1/00602; H04N 1/00615; H04N 1/3263; H04N 1/32657
USPC ............. 271/91, 8.1, 121–124; 358/1.14, 498
See application file for complete search history.

(56) References Cited

U.S. PATENT DOCUMENTS

| | | | |
|---|---|---|---|
| 7,341,178 B2 * | 3/2008 | Fujikawa | 235/379 |
| 7,866,666 B2 * | 1/2011 | Saikawa et al. | 271/265.04 |
| 2005/0228535 A1 | 10/2005 | Simonis et al. | |
| 2006/0145412 A1 | 7/2006 | Tagawa et al. | |
| 2009/0243203 A1 * | 10/2009 | Yokoyama et al. | 271/262 |
| 2010/0033774 A1 * | 2/2010 | Ridl et al. | 358/498 |

FOREIGN PATENT DOCUMENTS

| | | |
|---|---|---|
| JP | 2004-269241 | 9/2004 |
| JP | 2006-245953 A | 9/2006 |
| JP | 2009-286581 A | 12/2009 |

OTHER PUBLICATIONS

Canon Inc., User Manual (functional detail) of scanner "DR-X10C", <URL: http://cweb.canon.jp/manual/dr/pdf/drx10c-usermanual2.pdf>.
Japanese Office Action issued Japanese Application No. 2010-112444 mailed Dec. 10, 2013, with English translation, 8 pgs.
Japanese Office Action issued in Japanese Application No. 2010-112444 with Date mailed Feb. 25, 2014, with English Translation.

\* cited by examiner

*Primary Examiner* — Benny Q Tieu
*Assistant Examiner* — Quyen V Ngo
(74) *Attorney, Agent, or Firm* — McDermott Will & Emery LLP

(57) ABSTRACT

An image displaying apparatus includes a control unit and a display unit. The image displaying apparatus is connected to an image reading apparatus that includes a multifeed detecting mechanism. The control unit includes a display control unit that displays (i) an image of a medium which is read by the image reading apparatus and in which multifeed is detected by the multifeed detecting mechanism and (ii) a multifeed detected portion detected by the multifeed detecting mechanism on the display unit.

8 Claims, 8 Drawing Sheets

IMAGE DISPLAYING APPARATUS, IMAGE DISPLAYING METHOD, AND IMAGE DISPLAYING PROGRAM FOR DETECTING AND DISPLAYING MULTIFEED

CROSS-REFERENCE TO RELATED APPLICATION

This application is based upon and claims the benefit of priority from Japanese Patent Application No. 2010-112444, filed on May 14, 2010, the entire contents of which are incorporated herein by reference.

BACKGROUND OF THE INVENTION

1. Field of the Invention

The present invention relates to an image displaying apparatus, an image displaying method, and an image displaying program for displaying image data in which multifeed is detected by a multifeed detecting function of an image reading apparatus (e.g., a scanner, a copier, and a facsimile).

2. Description of the Related Art

In an image reading apparatus (image scanner apparatus), there is widely used a multifeed detecting function using an ultrasonic sensor that can detect an overlap of papers (e.g., Japanese Patent Application Laid-open No. 2004-269241). However, there is a case where the multifeed detecting function erroneously detects a paper with a photo or a sticky note or the like attached thereto as a multifeed.

As means for avoiding this case, United States Patent Application No. 2005/0228535 discloses a technology for previously setting a length with which multifeed detection is disabled through a panel on a scanner before reading is started, and user manual (functional detail) of scanner "DR-X10C" released in home page of canon inc. "http://cweb.canon.jp/manual/dr/pdf/drx10c-usermanua12.pdf" discloses a technology for previously setting a starting position and an ending position at which multifeed detection is disabled through a screen on a personal computer connected to a scanner before reading is started.

In addition, a technology for displaying a multifeed-detected image on a screen and causing an operator to determine whether the image is to be loaded or discarded.

However, according to the conventional technologies, there is a problem that the length and the position to be disabled have to be previously set, and this causes an operator to carry out complicated and troublesome operations for the setting. Moreover, there is another problem that it is difficult for an operator to identify a cause of multifeed error only by images displayed on the screen.

SUMMARY OF THE INVENTION

It is an object of the present invention to at least partially solve the problems in the conventional technology.

An image displaying apparatus according to one aspect of the present invention includes a control unit and a display unit. The image displaying apparatus is connected to an image reading apparatus that includes a multifeed detecting mechanism. The control unit includes a display control unit that displays an image of a medium which is read by the image reading apparatus and in which multifeed is detected by the multifeed detecting mechanism, and a multifeed detected portion detected by the multifeed detecting mechanism on the display unit.

An image displaying method according to one aspect of the present invention is implemented by a control unit of an image displaying apparatus that includes the control unit and a display unit and is connected to an image reading apparatus including a multifeed detecting mechanism. The image displaying method includes a display controlling step of displaying an image of a medium which is read by the image reading apparatus and in which multifeed is detected by the multifeed detecting mechanism, and a multifeed detected portion detected by the multifeed detecting mechanism on the display unit.

An image displaying program product according to one aspect of the present invention makes a control unit of an image displaying apparatus that includes the control unit and a display unit and is connected to an image reading apparatus including a multifeed detecting mechanism implement an image displaying method. The image displaying method includes a display controlling step of displaying an image of a medium which is read by the image reading apparatus and in which multifeed is detected by the multifeed detecting mechanism, and a multifeed detected portion detected by the multifeed detecting mechanism on the display unit.

A recording medium according to one aspect of the present invention includes the image displaying program product described above.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of an image displaying apparatus, an image displaying method, and an image displaying program according to the present invention will be explained in detail below with reference to the accompanying drawings. It should be noted that the present invention is not limited by the embodiments.

1. Configuration of Present Embodiment

1-1. Overview of Configuration

Figure 1:
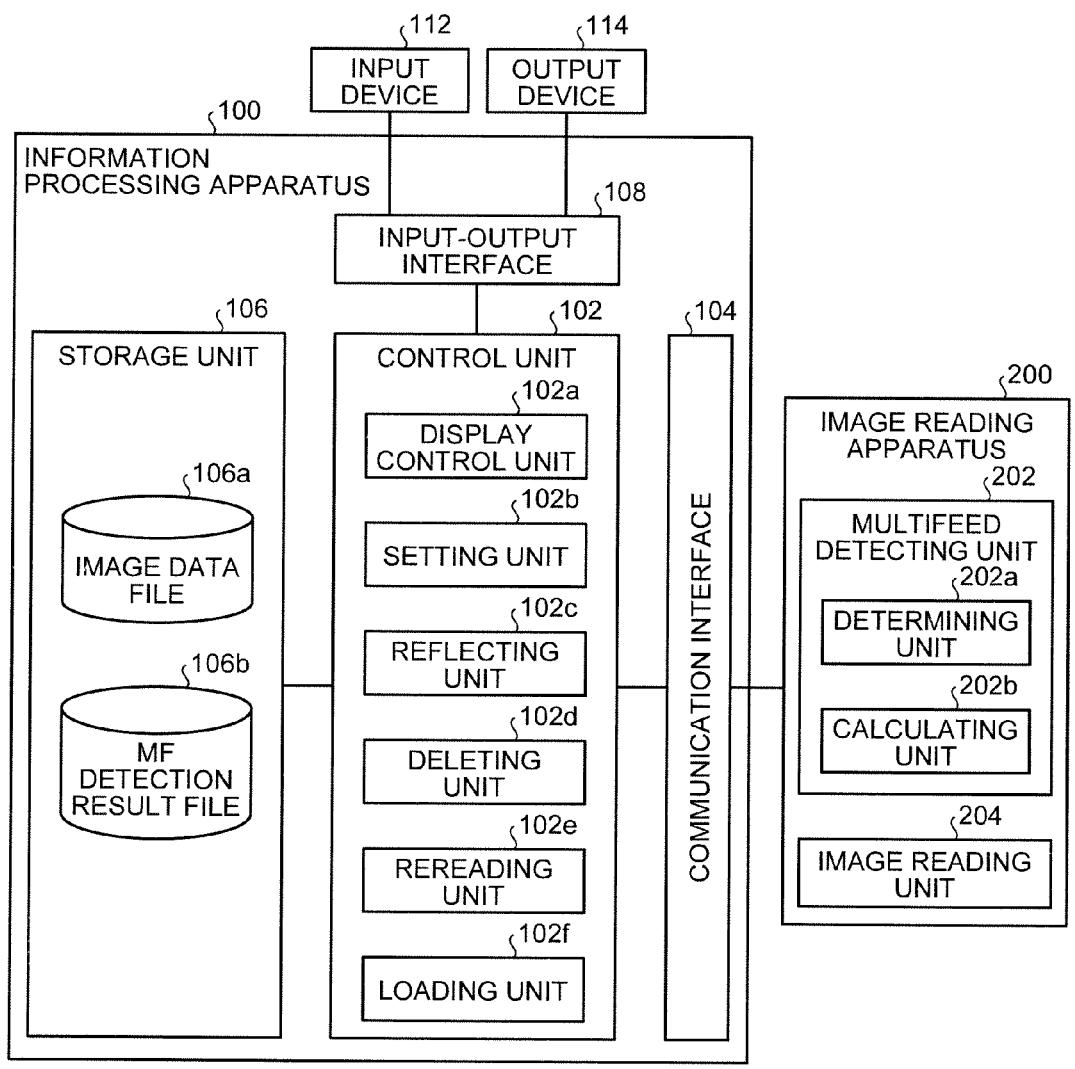
FIG. 1 is a diagram representing one example of a configuration of an information processing apparatus according to a present embodiment.

First, the overview of a configuration of an information processing apparatus 100 according to a present embodiment will be explained with reference to FIG. 1. FIG. 1 is a diagram representing the overview of the configuration of the information processing apparatus according to the present embodiment applied to the image displaying apparatus according to the present invention.

The information processing apparatus 100 is specifically a personal computer (PC), and includes a control unit 102, a communication interface 104, a storage unit 106, and an input-output interface 108, which are communicably connected to each other through an arbitrary communication path. The information processing apparatus 100 is communicably connected to an image reading apparatus 200.

Here, the image reading apparatus 200 is specifically a scanner, a copier, a facsimile, or the like, and includes a multifeed detecting unit 202 and an image reading unit 204. The multifeed detecting unit 202 is a mechanism for detecting (sensing) a multifeed (MF) of a fed paper, and includes, for example, an ultrasonic (US) sensor (hardware) for detecting an overlap of papers and the thickness thereof using ultrasonic waves and a processing unit (software) for detecting whether MF occurs from the output of the US sensor. The multifeed detecting unit 202 includes a determining unit 202a and a calculating unit 202b as processing units. When MF is detected by the US sensor, the determining unit 202a compares a portion where the MF is detected with a preset MF detection range (including an area or a length where MF detection of the US sensor is regarded as valid, or including an area or a length where MF detection of the US sensor is regarded as invalid), and determines whether the portion is regarded as MF error. The calculating unit 202b calculates a length of the paper (a length from an upper edge to a lower edge of the paper) from an output result of the US sensor or image data read by the image reading unit 204. When the length of the paper is calculated by the calculating unit 202b, the determining unit 202a compares the length and a preset reference length (e.g., a length of a first sheet of paper+10 mm), and determines whether the paper is regarded as MF error. A specific example of the configuration of the multifeed detecting unit 202 will be explained in detail later in "1-2. Specific Example of Configuration". The image reading unit 204 is a mechanism for reading a fed paper by a paper sensor and generating an image of the paper.

The communication interface 104 communicably connects the information processing apparatus 100 to the image reading apparatus 200 and other terminals through a communication device such as a router and a wired or wireless communication line such as a dedicated line.

The storage unit 106 stores therein various types of databases, tables, and files, or the like. The storage unit 106 is a storage unit, which can be a memory device such as RAM (Random Access Memory) and ROM (Read Only Memory), a fixed disk drive such as a hard disk, a flexible disk, and an optical disc, or the like. The storage unit 106, as shown in this figure, stores therein an image data file 106a and an MF detection result file 106b. The image data file 106a stores therein image data for the paper read by the image reading apparatus 200. The MF detection result file 106b stores therein output results (specifically, the MF detection range, and the like) of the US sensor included in the multifeed detecting unit 202 of the image reading apparatus 200.

The input-output interface 108 connects an input device 112 and an output device 114 to the information processing apparatus 100. Here, as the output device 114, a speaker and a printer, in addition to a monitor (including a home-use television) can be used (hereinafter, the output device 114 may sometimes be described as a monitor 114). As the input device 112, in addition to a keyboard, a mouse, and a microphone, a monitor for achieving a pointing device function in cooperation with the mouse can be used.

The control unit 102 includes a CPU (Central Processing Unit) for integrally controlling the information processing apparatus 100, and the like. The control unit 102 includes an internal memory for storing therein a control program such as OS (Operating System) and programs defining various processing procedures or the like and also storing therein required data, and performs information processing for executing various processes based on the programs. As shown in this figure, the control unit 102 roughly includes a display control unit 102a, a setting unit 102b, a reflecting unit 102c, a deleting unit 102d, a rereading unit 102e, and a loading unit 102f.

The display control unit 102a displays (i) images of papers which are read by the image reading apparatus 200 and in which MF is detected by the multifeed detecting mechanism 202 and (ii) an MF detected portion (MF detected area) detected by the multifeed detecting mechanism 202, on the monitor 114.

The display control unit 102a displays the MF detected portion detected within the area or the length, set by the setting unit 102b explained later, in which multifeed detection detected by the multifeed detecting mechanism 202 is disabled, on the monitor 114 characteristically (specifically, the MF detected portion is applied with a color or a pattern or the like different from that in the other MF detected portions).

The display control unit 102a notifies an operator of the fact that the MF detected portion is detected within the area or the length, set by the setting unit 102b explained later, in which multifeed detection detected by the multifeed detecting mechanism 202 is disabled, after the image reading apparatus 200 finishes the reading. Specifically, after the image reading apparatus 200 completes the reading of a plurality of papers, the display control unit 102a displays the read images of the papers in thumbnail form on the monitor 114 and highlights the image including the MF detected portion detected in the area or the length where the multifeed detection is disabled, using a color or a pattern or the like.

The display control unit 102a displays a length of the paper and a difference between the length and a preset reference length on the monitor 114.

The setting unit 102b causes the operator to set an MF detection range including an area or a length where multifeed detection performed by the multifeed detecting mechanism 202 is enabled or disabled. The reflecting unit 102c reflects (previews) the MF detection range set by the setting unit 102b in the MF detected portion displayed on the monitor 114.

The deleting unit 102d deletes the image displayed on the monitor 114. The rereading unit 102e causes the image reading apparatus 200 to reread the paper. The loading unit 102f loads (stores) the image displayed on the monitor 114 into the image data file 106a.

1-2. Specific Example of Configuration

Next, a specific example of the configuration of the image reading apparatus 200 connected with the information processing apparatus 100 configured in the above manner will be explained in detail with reference to FIG. 2 and FIG. 3. A specific configuration of the image reading apparatus which is a scanner is explained herein, however, the image reading apparatus is not limited to the scanner, and thus can be applied to a copier, a facsimile, and the like.

Figure 2:
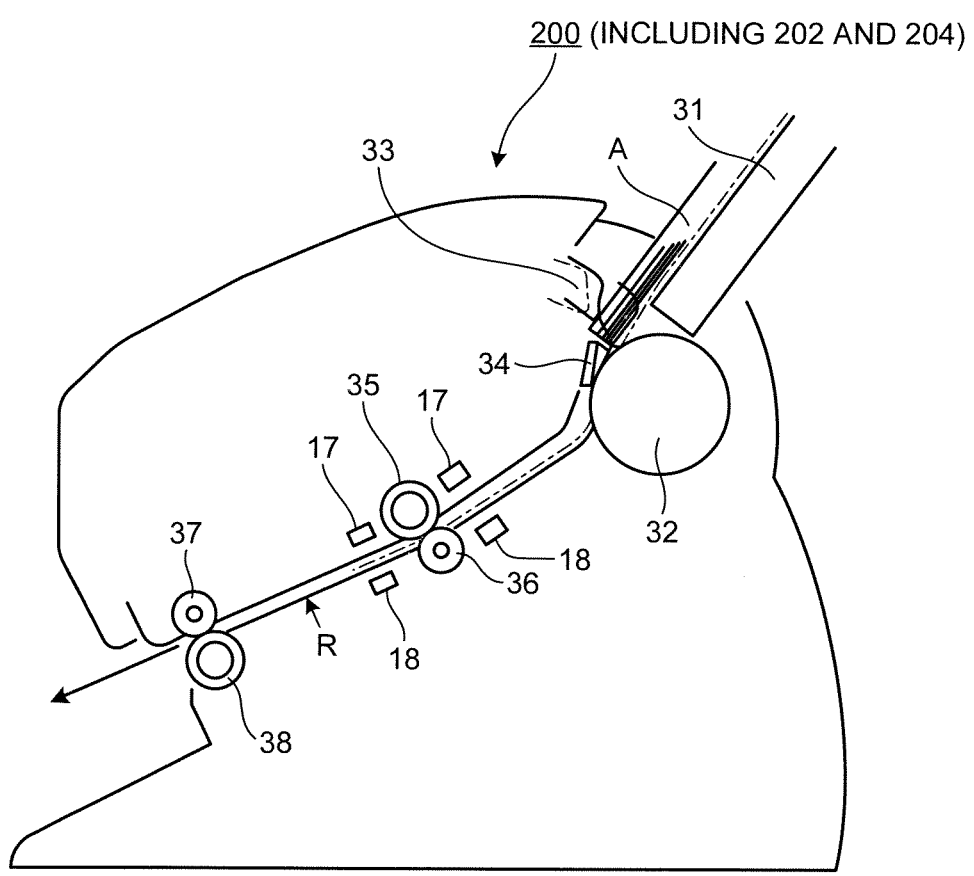
FIG. 2 is a schematic representing a configuration of a scanner being a specific example of an image reading apparatus according to the present embodiment.

FIG. 2 is a schematic representing an overview of a cross section of a scanner as the image reading apparatus 200 (hereinafter, sometimes described as "scanner 200"), and this figure shows an overview of the configuration of the scanner to which the multifeed processing unit 202 and the image reading unit 204 are applied.

As shown in FIG. 2, the scanner 200 includes a paper mounting table (shooter) 31, a pick roller 32, a pick arm 33, a separation pad 34, feed rollers 35 and 36, and ejection rollers 37 and 38. The scanner 200 also includes a transmission-side ultrasonic sensor 17 and a reception-side ultrasonic sensor 18 of an ultrasonic detector, which is explained later, corresponding to the multifeed detecting unit 202. In FIG. 2, a dashed two-dotted line indicates a feed path of a paper A, and an arrow R indicates a reading position of the paper A.

Papers A placed on the paper mounting table (shooter) 31 are picked by the pick roller 32 in a state where the papers A are applied with an appropriate pressing force by the pick arm 33. At this time, the papers A are sequentially separated from their lower side sheet by sheet by the pick roller 32 and the separation pad 34. The picked paper A is further fed to the feed rollers 35 and 36 by the pick roller 32, is fed to a reading position by the feed rollers 35 and 36, is read by the image reading unit 204 at the reading position, and is ejected by the ejection rollers 37 and 38. During feeding of the paper A along the feed path, a plurality of sheets (usually two sheets) or multiply fed papers A which are not separated into one sheet each even by the separation pad 34 are detected by the transmission-side ultrasonic sensor 17 and the reception-side ultrasonic sensor 18. Therefore, as shown in FIG. 2, the transmission-side ultrasonic sensor 17 and the reception-side ultrasonic sensor 18 are disposed on the upstream side of the reading position where the paper is read by the image reading unit 204 in the feed path. Particularly, the sensors are disposed on the downstream side or the upstream side of the feed rollers 35 and 36.

Figure 3:
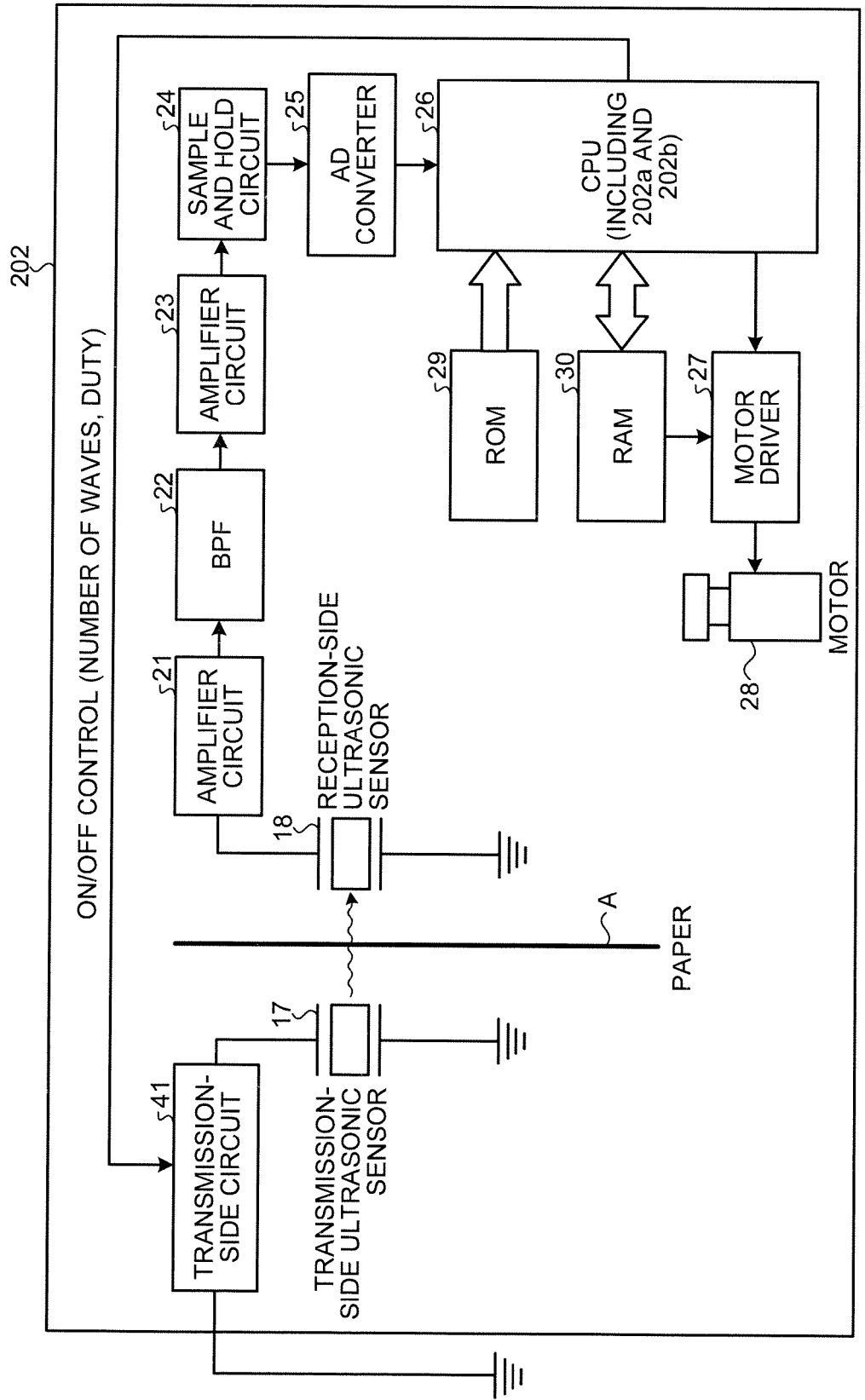
FIG. 3 is a diagram representing one example of a configuration of a multifeed detecting unit included in the scanner shown in FIG. 2.

FIG. 3 is a diagram representing one example of a specific configuration of the multifeed detecting unit 202. In FIG. 3, the ultrasonic detector corresponding to the multifeed detecting unit 202 detects feeding of a plurality of papers A using ultrasonic waves. The ultrasonic detector includes the transmission-side ultrasonic sensor 17, a drive circuit thereof (transmission-side circuit, hereinafter the same) 41, the reception-side ultrasonic sensor 18, a setting unit (26) for setting a threshold used to detect feeding of a plurality of papers A (multifeed), and a detector (26) for detecting the feeding of the plurality of papers A.

The transmission-side ultrasonic sensor 17 emits an ultrasonic wave. The drive circuit 41 supplies a drive signal for driving the transmission-side ultrasonic sensor 17 thereto. The drive circuit 41 is configured with a circuit (which can ON/OFF control) that oscillates at a frequency near a resonant frequency of the transmission-side ultrasonic sensor 17. The reception-side ultrasonic sensor 18 is disposed so as to face the transmission-side ultrasonic sensor 17 across a paper feed path, and receives the ultrasonic wave. The setting unit sets a threshold used to detect the feeding of the plurality of papers A using an output of the reception-side ultrasonic sensor 18 as a reference value when an output of the transmission-side ultrasonic sensor 17 is stopped by the drive circuit 41. The detector compares the output of the reception-side ultrasonic sensor 18 and the threshold, and detects the feeding of the plurality of papers A.

The ultrasonic detector further includes an amplifier circuit 21 (at a first stage), a BPF (Band Pass Filter) 22, an amplifier circuit 23 (at a second stage), a sample and hold (S&H) circuit 24, an AD (Analog to Digital) converter 25, CPU 26, a motor driver 27, a motor 28, ROM 29, and RAM 30. These components constitute a reception-side circuit. More specifically, the reception-side ultrasonic sensor 18 outputs an electrical signal according to the ultrasonic wave received from the transmission-side ultrasonic sensor 17, the amplifier circuit 21 amplifies the electrical signal, the BPF removes noise therefrom, and, thereafter, the amplifier circuit 23 further amplifies the signal after the noise is removed. Then, after the sample and hold circuit 24 samples and holds (SH) a peak value of the signal, the AD converter 25 converts the peak value (analog signal) into a digital value (digital signal). The AD converter 25 inputs the digital signal (input signal) to the CPU 26 (the setting unit and the detector therein), where it is analyzed. More specifically, the setting unit and the detector implemented by a setting and detection processing program (and hardware) on the CPU 26 analyze the input signal. The setting and detection processing program is stored in, for example, the ROM 29 and/or the RAM 30. When a multifeed is detected, the CPU 26 (or detector) transmits the drive signal to the motor driver 27, and causes the motor 28 to drive so as to stop feeding of (a plurality of) papers A. The CPU 26 includes the determining unit 202a and the calculating unit 202b, and when MF is detected, the CPU 26 (or detector) transfers the result of output of the ultrasonic sensor to the determining unit 202a and the calculating unit 202b.

The ultrasonic detector includes the transmission-side circuit (drive circuit) 41. The transmission-side circuit 41 is configured from a drive IC, a resistance/frequency-controlled oscillator (OSC), and a variable resistor. The drive IC is a drive circuit for supplying a drive signal to drive the transmission-side ultrasonic sensor 17 thereto. This causes the transmission-side ultrasonic sensor 17 to emit an ultrasonic wave. The reception-side ultrasonic sensor 18 receives the ultrasonic wave, and outputs a detection signal according to the intensity of the received ultrasonic wave. For example, when the paper A is not present between the transmission-side ultrasonic sensor 17 and the reception-side ultrasonic sensor 18, the reception-side ultrasonic sensor 18 detects a signal with a certain level (ordinary level), and detects a signal with a level (normal level) less than the ordinary level but more than a predetermined threshold when a sheet of paper A is present. When two sheets (or more) of paper A are present, the reception-side ultrasonic sensor 18 detects a signal with a level (abnormal level) less than the ordinary level and the threshold. For example, before feeding of the paper A, the drive IC is controlled so that the reception-side ultrasonic sensor 18 detects the signal with the ordinary level (in actual cases, the signal with a level equal to or more than the ordinary level). More specifically, the drive IC is controlled so that the drive frequency of the drive signal coincides with the resonant frequency of the transmission-side ultrasonic sensor 17 based on the ultrasonic wave received by the reception-side ultrasonic sensor 18 without using the variable resistor.

The setting unit sets (generates) a threshold used to detect feeding of a plurality of papers A using an output of the reception-side ultrasonic sensor 18 as a reference value when an output of the transmission-side ultrasonic sensor 17 is stopped by the drive circuit 41. The threshold is determined by adding a fixed value (correction value) to the output (average value of input signals from the reception-side ultrasonic sensor 18) of the reception-side ultrasonic sensor 18 when an output of the transmission-side ultrasonic sensor 17 is stopped. More specifically, the CPU 26 (sensor control unit therein) transmits a control signal to the transmission-side circuit 41 and causes the oscillation of the transmission-side circuit 41 to stop. The CPU 26 (sensor control unit therein) applies a predetermined bias voltage to the amplifier circuit 23 (computation amplifier therein). In this state, the CPU 26 (generation unit therein) repeatedly receives the input signals, tens of times, for example, 32 times, from the reception-side ultrasonic sensor 18 through the AD converter 25, and calculates an average value thereof to set the value as a reference value. More specifically, the signals at 32 points within, for example, one raster are measured. The CPU 26 (generation unit therein) corrects to add the correction value to the reference value and generates the threshold, and stores the threshold in the CPU 26 (register therein). Here, the correction value is determined empirically for each device to be installed allowing for the influence of noise or the like. It should be noted that the correction value may be determined beforehand and that the correction value may be determined, each time it is required, as a variable value for each device for allowing for influence of variation in sensitivity/sound pressure of the ultrasonic sensor, variation in fixture, surroundings, and adhesion of paper dust or the like.

The detector compares the output of the reception-side ultrasonic sensor 18 and the threshold, and detects feeding of a plurality of papers A. The CPU 26 (sensor control unit therein) transmits a control signal to the transmission-side circuit 41 and the like to cause the transmission-side circuit 41 to oscillate. Moreover, the CPU 26 (sensor control unit therein) applies a predetermined bias voltage to the amplifier circuit 23 (computation amplifier therein). In this state, the CPU 26 (comparator therein) repeatedly receives the input signals (digital values), tens of times, for example, 32 times, from the reception-side ultrasonic sensor 18 through the AD converter 25, and holds the received signals. At this time, the oscillation (transmission-side drive pulses) of the transmission-side circuit 41 is stopped and the signals at a plurality of predetermined positions, for example, at 32 points are measured. The measuring position is set to once in, for example, each raster or once in a plurality of rasters. When an output waveform of the reception-side ultrasonic sensor 18 is getting larger to become a maximum value, the maximum value is sampled and held. Next, the CPU 26 (sensor control unit or comparator therein) sets a timer for SH interrupt, and determines whether an interrupt occurs. The SH interrupt is set so as to occur 32 times when, for example, 32 input signals are to be obtained as explained above. In other words, the SH interrupt triggers continuous outputs of drive pulses in the transmission side. For example, 32 times of SH interrupts occur in once in each raster with the passage of a predetermined time. When the interrupt does not occur, the determination of occurrence of the interrupt is repeated. When an interrupt occurs, an average value of 32 values previously received and held, for example, a moving average value is calculated, and this value is determined as a value of an input signal used to detect the multifeed (MF). Thereafter, the CPU 26 (comparator therein) compares the value of the input signal with the threshold of the register. When the value of the input signal is equal to or more than the threshold, the CPU 26 (comparator therein) determines that the result is normal paper feeding, while when the value of the input signal is less than the threshold, the CPU 26 (comparator therein) determines whether the number of times in this case is predetermined times, for example, ten times or more.

When it is determined that the number of times is 10 times or more, the CPU 26 (comparator therein) determines that a multifeed occurs, and outputs an error signal. When it is determined that the number of times is not 10 times or more, the following processes performed after the timer is set are repeated. The error signal is then input to the determining unit 202a of the CPU 26.

2. Processes of Present Embodiment

Here, one examples of processes respectively executed in the information processing apparatus 100 (hereinafter, sometimes described as "PC 100") and the image reading apparatus 200 (hereinafter, sometimes described as "scanner 200") configured in the above manner will be explained with reference to FIG. 4, FIG. 5, and the like.

At first, one example of a main process executed in the scanner 200 side will be explained with reference to FIG. 4.

First, when MF detection being valid is selected (when MF detection is set as valid), the multifeed detecting unit 202 of the scanner 200 starts MF detection from the upper edge (leading edge) of the paper using the ultrasonic (US) sensor (Step SA1).

Next, the multifeed detecting unit 202 stores output results (MF detection results) of the US sensor in a memory at certain intervals (Step SA2).

Next, the multifeed detecting unit 202 checks whether MF detection by the US sensor has reached the lower edge of the paper. When the MF detection has not reached the lower edge (No at Step SA3), the multifeed detecting unit 202 performs again Step SA2.

Then, when the MF detection has reached the lower edge (Yes at Step SA3) and when the US sensor further detects MF during the upper edge to the lower edge of the paper (Yes at Step SA4), the determining unit 202a of the multifeed detecting unit 202 compares the output result of the US sensor (specifically, an MF detected area) with a previously specified (set) detection condition (Step SA5). Specifically, the determining unit 202a (1) determines whether the MF detected area where MF is detected by the US sensor is within a preset valid area (or length regarded as valid) or invalid area (or length regarded as invalid) of the MF detection by the US sensor, and (2) determines the MF detection performed by the US sensor as valid when the MF detected area is within the valid area or is not within the invalid area and determines the MF detection performed by the US sensor as invalid when the MF detected area is not within the valid area or is within the invalid area.

Next, when the MF detection performed by the US sensor is determined as valid (Yes at Step SA6), the determining unit 202a determines this case as "MF error" according to the MF detection performed by the US sensor (Step SA7).

Meanwhile, when the MF detection performed by the US sensor is determined as invalid (No at Step SA6), the determining unit 202a ignores the MF detection performed by the US sensor and determines this case as "No MF error" and also stores information indicating that the MF detection performed by the US sensor is determined as invalid in the output result of the US sensor (specifically, the MF detection range of the US sensor and the information indicating that the MF detection is determined as invalid are stored in association with each other) (Step SA8).

Next, the calculating unit 202b of the multifeed detecting unit 202 calculates the length of the paper (specifically, the length from the upper edge to the lower edge of the paper) from the image data of the read paper or the output result of the US sensor (Step SA9).

Next, when a detection mode to detect MF due to a difference in lengths of papers is selected to its valid state (Yes at Step SA10), the determining unit 202a compares the length of the paper calculated at Step SA9 and the preset reference length (e.g., a length of the first sheet of paper+10 mm) (Step SA11).

Next, when the result of comparison at Step SA11 is "longer than the reference length" (Yes at Step SA12), the determining unit 202*a* determines this case as "MF error" (Step SA13).

Next, the scanner 200 checks whether transfer of the image data to the PC 100 has been finished. When the transfer to the PC 100 has been completed (Yes at Step SA14) and if "MF error" is further determined (Yes at Step SA15), the scanner 200 notifies the PC 100 of the MF error (Step SA16), and notifies the PC 100 of the output result of the US sensor (specifically, the MF detection range) stored in the memory and of the paper length calculated at Step SA9 (Step SA17). Meanwhile, when "MF error" is not determined (No at Step SA15) and if there is next paper (Yes at Step SA18), the scanner 200 performs again the processes at Step SA1 and thereafter.

As mentioned above, the one example of the main process performed in the scanner 200 side has been explained. As a result of performing the main process, the image data for each read paper is transferred to the PC 100. In addition, when "MF error" is determined by the scanner 200, then the determination result of the MF error, the output result of the US sensor (which, specifically, includes the MF detected area and the information indicating that the range is determined as invalid in some cases), and the paper length are transferred thereto.

Subsequently, one example of the main process performed in the PC 100 side will be explained with reference to FIG. 5 and the like.

First, the control unit 102 of the PC 100 acquires the image data transferred from the scanner 200 (Step SB1).

Next, when it is determined as "MF error" by the scanner 200, the control unit 102 acquires the determination result of MF error notified from the scanner 200 (Step SB2).

Next, when it is determined as "MF error" by the scanner 200, the control unit 102 acquires the output result of the US sensor (which, specifically, includes the MF detected area and the information indicating that the range is determined as invalid in some cases) notified from the scanner 200 and also acquires the paper length, and stores the acquired data in a predetermined memory area of the MF detection result file 106*b* (Step SB3).

Then, when it is determined as "MF error" by the scanner 200, the display control unit 102*a* displays MF detection check screens MA as shown in, for example, FIG. 6 to FIG. 9 on the monitor 114 based on the image data, the output result of the US sensor (MF detected area), the paper length, the preset MF detection range (which is, specifically, the MF detection range including the valid area (or the length regarded as valid) and/or the invalid area (or the length regarded as invalid) of the MF detection by the US sensor) and also based on the preset reference length (Step SB4). When it is not determined as "MF error" by the scanner 200, the display control unit 102*a* displays an MF detection check screen MB as shown in FIG. 10 on the monitor 114 (Step SB4).

Figure 6:
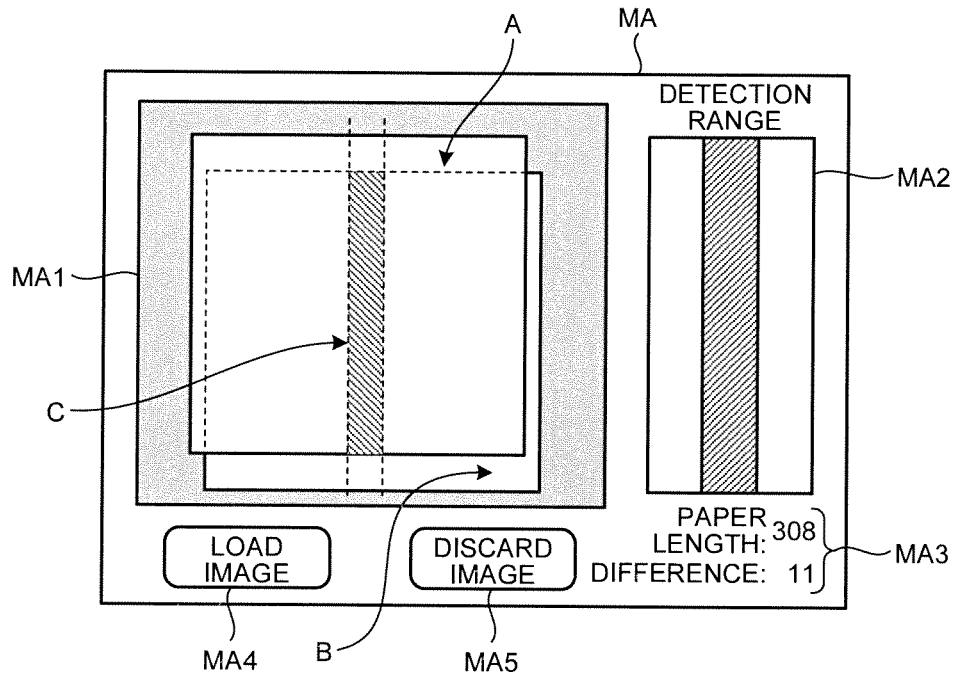
FIG. 6 is a schematic representing one example of an MF detection check screen.

Specifically, when two or more sheets of paper overlapped are determined as MF error by the scanner 200, the display control unit 102*a* performs the following processes (11) to (13) in an arbitrary order, to display the MF detection check screen MA as shown in FIG. 6 on the monitor 114. Here, one example of the MF detection check screen MA will be explained with reference to FIG. 6. The MF detection check screen MA includes an image display area MA1 to display image data, a variable display area MA2 to variably display an MF detection range including a valid area and/or an invalid area, a display area MA3 to display a numerical value of the paper length and a numerical value of a difference between the paper length and the reference length, an image load button MA4 to instruct loading (storage) of the image data displayed on the image display area MA1, and an image discard button MA5 to instruct discard (delete) of the image data displayed on the image display area MA1.

(11) Image data showing MF-detected paper A and paper B is displayed in the image display area MA1. Moreover, an MF detected area C in an overlap range of the paper A and the paper B MF-detected by the US sensor is displayed in a color or a pattern or the like.

(12) A preset MF detection range is displayed in the variable display area MA2 so as to be capable of discriminating the valid area from the invalid area using a color or a pattern or the like. It should be noted that the variable display area MA2 shown in FIG. 6 is one example in which the MF detection range including only the valid area is set.

(13) A numerical value of the paper length and a numerical value of a difference between the paper length and the reference length are displayed in the display area MA3.

Consequently, a source of the MF error can be easily checked on the screen. In addition, it is easily determined whether the image is loaded or discarded.

Figure 7:
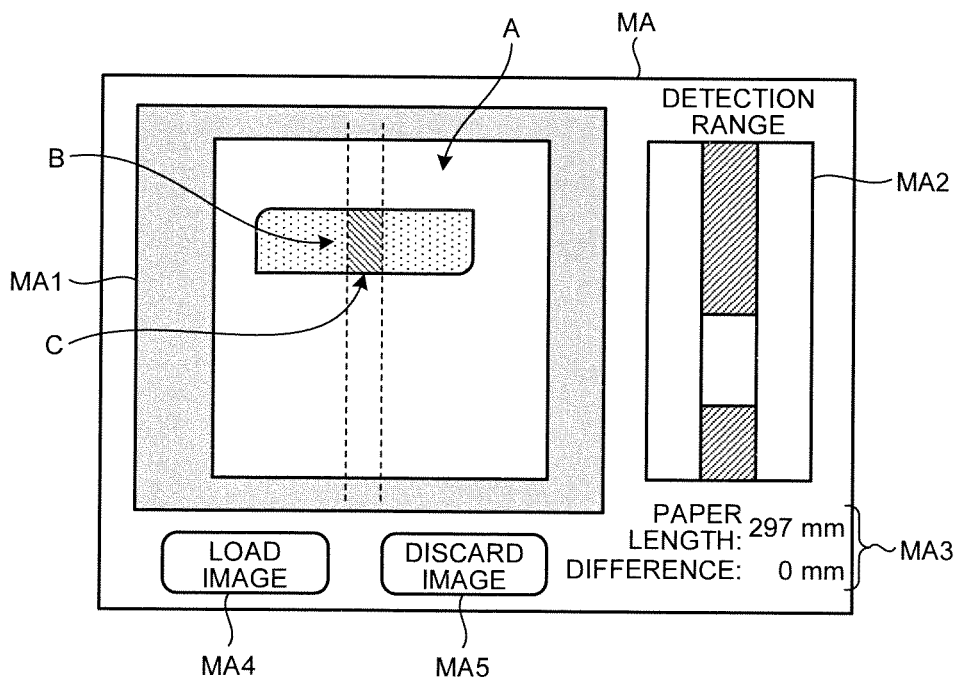
FIG. 7 is a schematic representing one example of the MF detection check screen.

Moreover, in a specific case where a paper with an attached seal is determined as MF error by the scanner 200, the display control unit 102*a* performs the following processes (21) to (23) in an arbitrary order, and displays an MF detection check screen MA as shown in FIG. 7 on the monitor 114.

(21) Image data showing the MF-detected paper A and a seal B attached to the paper A is displayed in the image display area MA1. Moreover, an MF detected area C in the seal B MF-detected by the US sensor is displayed in a color or a pattern or the like.

(22) A preset MF detection range is displayed in the variable display area MA2 so as to be capable of discriminating the valid area from the invalid area using a color and a pattern or the like. It should be noted that the variable display area MA2 shown in FIG. 7 is one example in which the MF detection range including the valid area and the invalid area is set. Here, sizes and positions of the valid area and the invalid area displayed in the variable display area MA2 can be arbitrarily changed by the operator operating the input device 112.

Specifically, the sizes and positions of the valid area and the invalid area can be arbitrarily changed from the state shown in FIG. 7. When the operator changes the sizes and positions of the valid area and the invalid area, the setting unit 102*b* transfers the setting of the valid area and the invalid area after the change to the scanner 200 and updates the setting of the valid area and the invalid area in the scanner 200. The reflecting unit 102*c* reflects (previews) the changed setting of the valid area and the invalid area in the MF detection check screen MA (specifically, in the MF detected area C displayed in the image display area MA1).

(23) A numerical value of the paper length and unit (e.g., "mm"), and a numerical value of a difference between the paper length and the reference length and unit are displayed in the display area MA3.

Consequently, the set detection range (length) is reflected to an US-sensor output of the screen. The result of MF error is previously known through a preview function. Therefore, an unnecessary operation to be performed again can be omitted.

Figure 4:
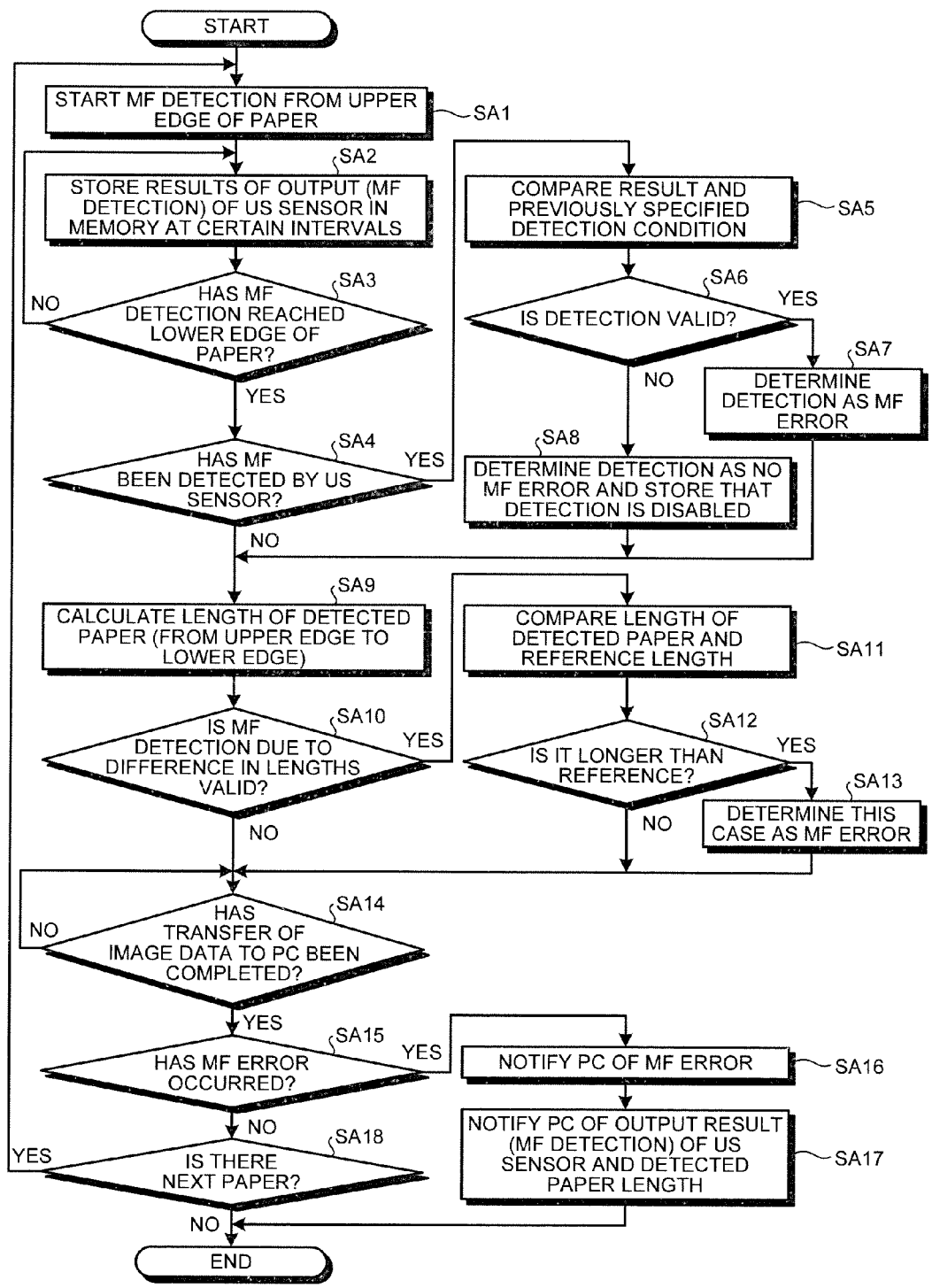
FIG. 4 is a flowchart representing one example of a scanner-side main process according to the present embodiment.
Figure 5:
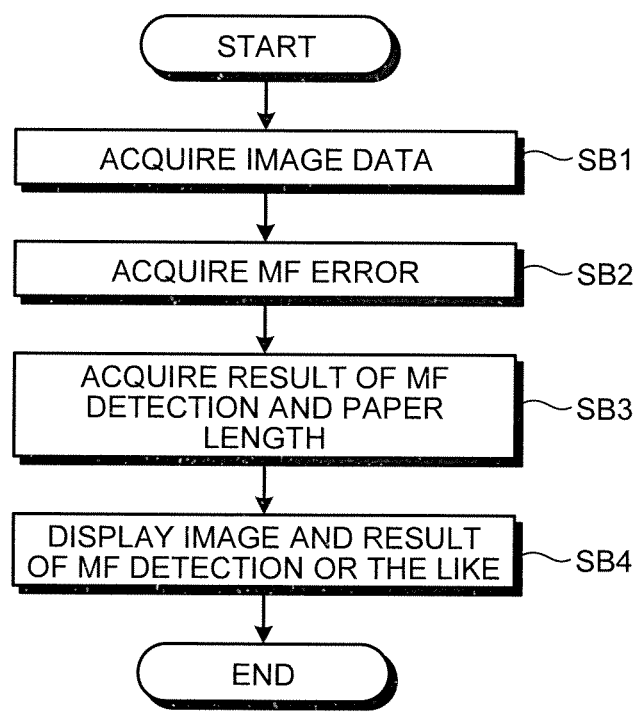
FIG. 5 is a flowchart representing one example of a PC-side main process according to the present embodiment.
Figure 8:
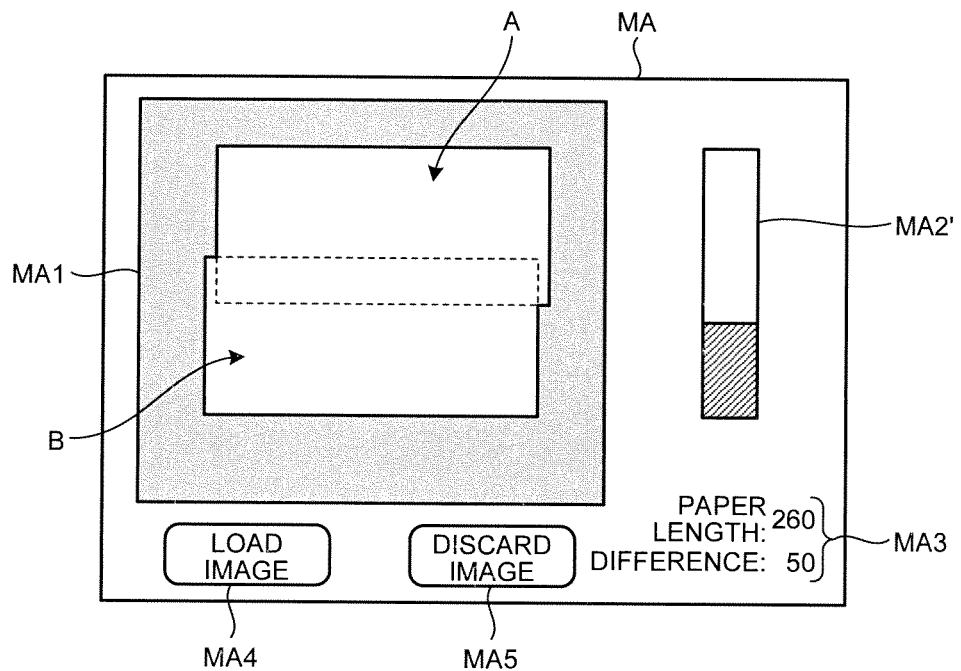
FIG. 8 is a schematic representing one example of the MF detection check screen.

Moreover, in a specific case where MF error is detected due to a difference in lengths of the papers by the scanner 200 (when Step SA13 of the main process in the scanner 200 side shown in FIG. 4 is performed), the display control unit 102*a* performs the following processes (31) to (33) in an arbitrary order, and displays an MF detection check screen MA as shown in FIG. 8 on the monitor 114.

(31) Image data showing MF-detected paper A and paper B is displayed in the image display area MA1.

(32) A length (size) of a display area MA2' (an area for displaying a paper length and a difference between the paper length and the reference length (e.g., ordinary paper length+10 mm)) provided instead of the variable display area MA2 is changed to a length corresponding to the paper length, and thus the paper length can be recognized on the display. Moreover, a color or a pattern or the like is applied to a portion (specifically, a portion longer than the reference length) corresponding to the difference between the paper length and the reference length in the display area MA2', and thus the difference can be recognized on the display.

(33) A numerical value of the paper length and a numerical value of a difference between the paper length and the reference length are displayed in the display area MA3.

Consequently, when a paper of a fixed size is to be fed, information for making a decision is provided. A source of MF error can be easily checked on the screen.

Figure 9:
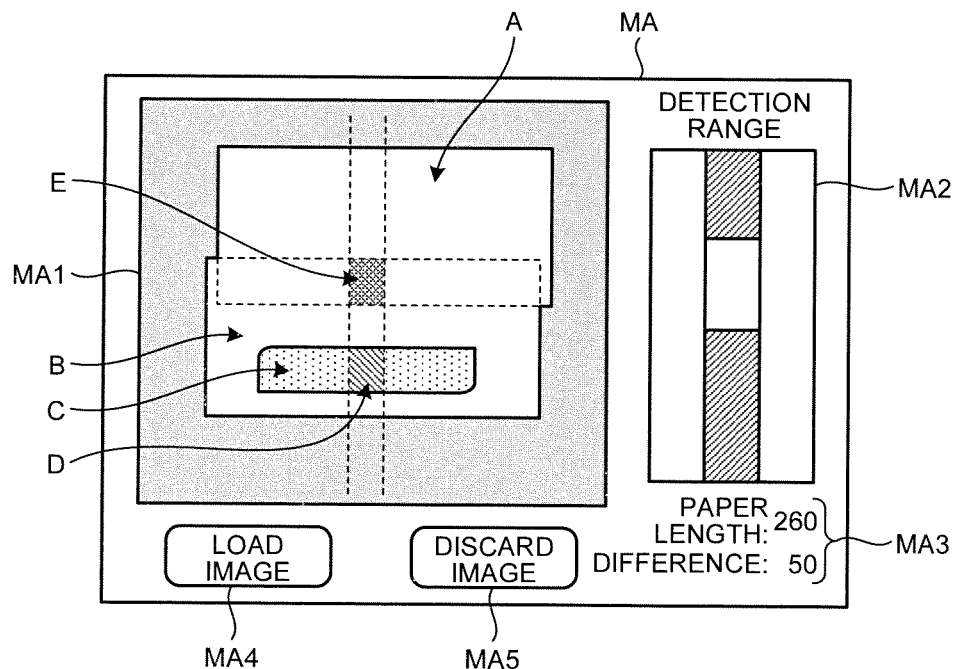
FIG. 9 is a schematic representing one example of the MF detection check screen.
Figure 10:
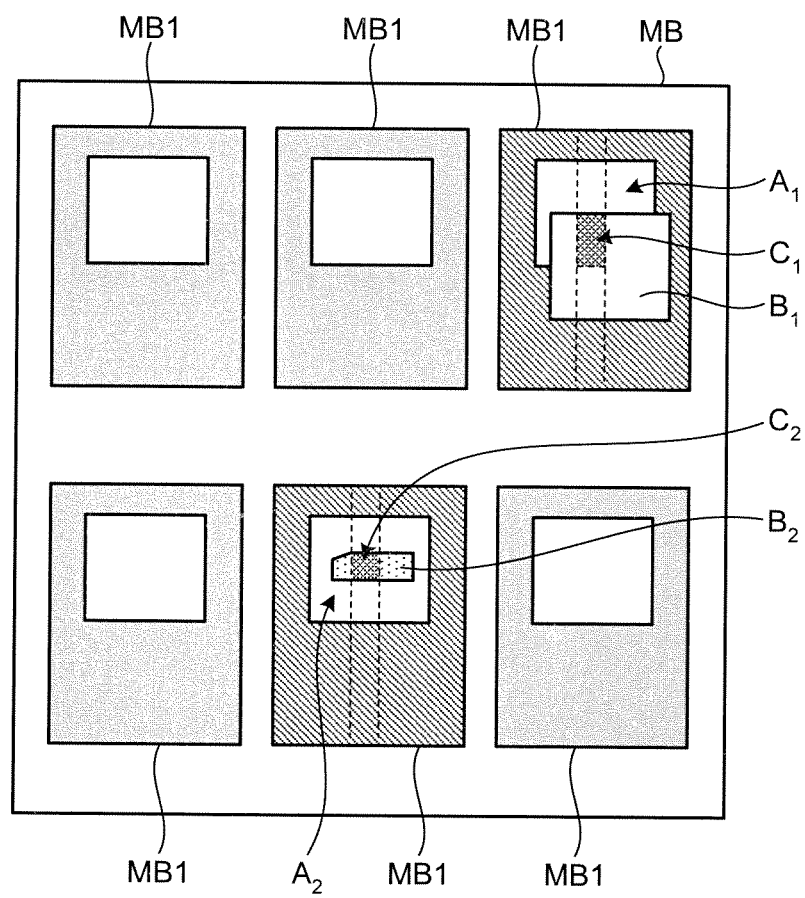
FIG. 10 is a schematic representing one example of the MF detection check screen.

Moreover, in a specific case where MF error is detected within the valid area and MF is also detected in the invalid area by the scanner 200 (when there is an MF detected area which is determined as "MF error" and there is also an MF detected area which is determined as "No MF error" in the scanner-side main process as shown in FIG. 4), the display control unit 102a performs the following processes (41) to (43) in an arbitrary order, and displays an MF detection check screen MA as shown in FIG. 9 on the monitor 114.

(41) Image data showing MF-detected paper A and paper B, and a seal C attached to the paper B is displayed in the image display area MA1. Moreover, an MF detected area D (area determined as "MF error") in the seal C MF-detected in the valid area is applied with a color or a pattern or the like and is displayed in the image display area MA1. In addition, an MF detected area E (area determined as "No MF error") within an overlap range of the paper A and the paper B MF-detected in the invalid area is applied with a different color or pattern or the like from the MF detected area D and is displayed in the image display area MA1.

(42) A preset MF detection range is displayed in the variable display area MA2 so as to be capable of discriminating the valid area from the invalid area using a color or a pattern or the like.

(43) A numerical value of the paper length and a numerical value of a difference between the paper length and the reference length are displayed in the display area MA3.

Consequently, a source of MF error can be easily checked on the screen.

Moreover, in a specific case where MF is detected within invalid areas of some sheets of papers when the scanner 200 is reading the papers (when there is no MF detected area determined as "MF error" but there is an MF detected area determined as "No MF error" in the scanner-side main process as shown in FIG. 4), the display control unit 102a performs the following processes (51) to (53) after the reading of all the papers by the scanner 200 is completed, and displays the MF detection check screen MB as shown in FIG. 10 on the monitor 114. Here, one example of the MF detection check screen MB will be explained with reference to FIG. 10. The MF detection check screen MB is a screen to display a plurality of image data in the form of thumbnail, and includes a plurality of image display areas MB1 to display image data.

(51) A plurality of image data are thumbnail-displayed in the image display areas MB1, respectively.

(52) The image display area MB1 (image display area located at the right side of the upper portion in FIG. 10) displayed with image data showing the paper $A_1$ and the paper $B_1$ MF-detected in the invalid area is highlighted with a characteristic color or pattern or the like. Moreover, an MF detected area $C_1$ (area determined as "No MF error") within an overlap range of the paper $A_1$ and the paper $B_1$ MF-detected in the invalid area is applied with a color or a pattern or the like, and is displayed in the image display area MB1.

(53) The image display area MB1 (image display area located at the center of the lower portion in FIG. 10) displayed with image data showing the paper $A_2$ and the seal $B_2$ attached to the paper $A_2$ MF-detected in the invalid area is highlighted with a characteristic color or pattern or the like. Moreover, an MF detected area $C_2$ (area determined as "No MF error") within the seal $B_2$ MF-detected in the invalid area is applied with a color or a pattern or the like, and is displayed in the image display area MB1.

Consequently, it is possible to perform checking again after the reading is completed, which allows improved reliability of MF error detection.

The operator then checks the MF detection check screen MA or the MF detection check screen MB displayed on the monitor 114 to identify (verify) the cause of the MF error.

Specifically, when the papers overlap, the operator presses the image discard button MA5 included in the MF detection check screen MA by operating the input device 112, to return the papers to the shooter (or hopper) of the scanner 200. When receiving the press, the deleting unit 102d discards the image data displayed in the image display areas MA1, and the rereading unit 102e transfers an instruction to rescan (reread) the paper, to the scanner 200.

Specifically, when the size and the position of an object attached to the paper are fixed, the operator appropriately adjusts the MF detection range of the variable display area MA2 by operating the input device 112 while viewing the MF detection check screen MA. After the adjustment is finished, the setting unit 102b transfers the adjusted MF detection range to the scanner 200 to update the setting of the MF detection range of the scanner 200. The reflecting unit 102c reflects the adjusted MF detection range in the MF detection check screen MA (specifically, the displayed MF detected area).

Specifically, when MF is not caused by an overlap of papers, the operator presses the image load button MA4 included in the MF detection check screen MA by operating the input device 112. When receiving the press, the loading unit 102f stores (loads) the image data displayed in the image display area MA1 in a predetermined memory area of the image data file 106a.

3. Summary of Present Embodiment, and Other Embodiments

As mentioned above, according to the present embodiment, not only the MF-detected image but also the output of the US sensor (MF detected portion) is further displayed in the MF detection check screen upon MF detection. Consequently, the cause of MF can be easily identified without causing the operator to perform complicated and troublesome setting operations of valid/invalid areas of MF detection. Moreover, a position on the paper at which MF is detected can be more clearly shown. In addition, the operability when the paper with attached sticky note or photo or the like is determined as MF can be improved.

Although only the MF-detected image is displayed so far, the cause of the MF error is difficult to be identified only by the image. Specifically, it is difficult to check a boundary of the papers only by the image, and it is also difficult to find out a portion at which the MF has occurred. Moreover, it is also necessary to check an MF-detected actual paper, and it is also troublesome to set a valid/invalid area of MF detection.

According to the present embodiment, therefore, when MF is detected, not only a screen for checking an MF-detected image is displayed on the PC but also an output of the US sensor (portion where MF is detected) is displayed on the screen. Consequently, a source of MF error can be easily checked on the screen. In addition, it is easily determined whether the image is loaded or discarded.

Moreover, according to the present embodiment, the valid/invalid area of MF detection is caused to be set through the MF detection check screen and is previewed. In addition, according to the present embodiment, the length regarded as MF detection is caused to be set through the MF detection check screen and is previewed. As a result, when the size and the attached position of an attachment such as a seal and a slip attached to the paper are fixed, the operator can arbitrarily set the valid area or the invalid area of the MF detection according to the attachment. By previewing the set area or length on the monitor, this enables the operator to know the result of MF error beforehand, thus omitting an unnecessary operation to be performed again (rereading operation of a medium).

According to the present embodiment, the detected paper length and the difference between the paper length and the reference length are displayed on the MF detection check screen. Consequently, when a paper of a fixed size is to be fed, the operator can easily check the source of the multifeed error. It should be noted that a method of determining MF with a change in the length of a fed paper is extremely effective in a scanner without the US sensor or the like.

According to the present embodiment, an output of the US sensor indicating MF detection within the preset invalid area is displayed in a different color or the like. This allows the cause of the multifeed to be more easily identified.

According to the present embodiment, even if MF is detected within the preset invalid area but it is not determined as MF error, the detection in the invalid area is notified to the user after the reading is finished so that the user can check it again. The image data is thumbnail-displayed, and a background color of the display area of the image data detected in the invalid area among thumbnail images is featured and highlighted. Consequently, the operator can check again the read state of each paper after the reading is completed, thus, improving the reliability of MF error detection.

According to the present embodiment, the user checks a highlighted image (the background is changed in the thumbnail screen), and deletes the image or causes the paper to be reread if necessary. Consequently, when papers overlap, the operator can easily implement discard of the image and rescan of the paper.

Moreover, the present invention may be implemented in various different embodiments in the scope of technical idea described in the appended claims other than the embodiment. For example, of the processes explained in the embodiment, all or part of the processes explained as automatically performed ones can be manually performed, or all or part of the processes explained as manually performed ones can be also automatically performed using known methods. A specific configuration of distribution or integration of the apparatuses is not limited to the illustrated one. The apparatuses can be configured by functionally or physically distributing or integrating all or part of the apparatuses in arbitrary units according to various types of additions or the like or according to functional loads. In addition, the process procedures, the control procedures, the specific names, and the screen examples shown in the present specification and the drawings can be arbitrarily modified unless otherwise specified.

The constituent elements of the information processing apparatus 100 shown in the drawings are functionally conceptual, and need not be physically configured as illustrated. For example, for the process functions provided in the information processing apparatus 100, especially for the process functions performed in the control unit 102, all or any part thereof may be implemented by a CPU and programs interpreted and executed in the CPU, and may be implemented as hardware by wired logic. The programs are recorded in a recording medium, explained later, and they are mechanically loaded into the information processing apparatus 100 as required. More specifically, computer programs to perform various processes are recorded in the storage unit 106 such as ROM or HD (Hard Disk). The computer programs are executed by being loaded into RAM, and form the control unit in cooperation with the CPU.

The image displaying apparatus according to the present invention may be configured as an information processing apparatus (including an information processing apparatus connected with arbitrary peripheral devices) such as known personal computer and work station. The image displaying apparatus according to the present invention can be achieved by installing software (including the programs, the data, and the like) to cause the information processing apparatus to implement the image display method according to the present invention. The image displaying program according to the present invention may be stored in a computer-readable recording medium, or can be configured as a program product. The "recording medium" mentioned here includes any "portable physical medium" such as a flexible disk, a magneto-optical disc, ROM, EPROM (Erasable Programmable Read Only Memory), EEPROM (Electronically Erasable and Programmable Read Only Memory), CD-ROM (Compact Disk Read Only Memory), MO (Magneto-Optical disk), and DVD (Digital Versatile Disk) or includes a "communication medium" that temporarily holds a program, such as a communication line and a carrier used to transmit the program through a network such as LAN (Local Area Network), WAN (Wide Area Network), and the Internet. The "program" mentioned here is a data processing method described in arbitrary language and description method, and thus any form such as a source code and a binary code is acceptable. It should be noted that the "program" is not necessarily limited to a program configured as a single unit, and, therefore, includes those distributedly configured as a plurality of modules and libraries and those in which the function of the program is achieved in cooperation with separate programs represented as OS. Regarding a specific configuration and a reading procedure to read a recording medium by the apparatuses shown in the embodiments, or an installation procedure after the reading, or the like, known configuration and procedures can be used.

According to the present invention, an image of a medium which is read by an image reading apparatus and where multifeed is detected by a multifeed detecting mechanism and a multifeed detected portion detected by the multifeed detecting mechanism are displayed on a display unit. Thus, there is such an effect that the cause of multifeed can be easily identified without causing an operator to perform complicated and troublesome operations.

According to the present invention, an area or a length in which the multifeed detection detected by the multifeed detecting mechanism is enabled or disabled is caused to be set, and the set area or length is reflected in the multifeed detected portion displayed on the display unit. Thus, there is such an effect that when the size and the attached position of an attachment such as a seal and a slip attached to the medium are fixed, the operator can arbitrarily set the valid area or length or the invalid area or length of the MF detection according to the attachment. There is such an effect that by previewing the set area or length on the display unit, this enables the operator to know the result of MF error beforehand, thus omitting an unnecessary operation to be performed again (rereading operation of a medium).

According to the present invention, the multifeed detected portion detected in the set area or length in which the multifeed detection is disabled is displayed on the display unit characteristically (specifically, in a color or pattern or the like different from that in the other multifeed detected portions). Thus, there is such an effect that this allows the cause of the multifeed to be more easily identified.

According to the present invention, after the image reading apparatus finishes reading, it is notified that the multifeed detected portion is detected in the set area or length in which the multifeed detection is disabled. Specifically, after the reading of a plurality of mediums is completed, the read images of the mediums are displayed in thumbnail form on the display unit, and the image including the multifeed detected portion detected in the area or the length where the multifeed detection is disabled is highlighted. Thus, there is such an effect that the operator can check again the read state of each medium after the reading is completed, thus improving the reliability of multifeed error detection.

According to the present invention, a length of the medium and a difference between the length and a preset reference length are displayed on the display unit. Thus, there is such an effect that when a medium of a fixed size is to be fed, the operator can easily check the source of the multifeed error.

According to the present invention, the image is deleted, and the image reading apparatus is caused to reread the medium. Thus, there is such an effect that when mediums overlap, the operator can easily implement discard of the image and rescan of the medium.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image displaying apparatus comprising:
   a control unit; and
   a display unit, the image displaying apparatus being connected to an image reading apparatus that includes a multifeed detecting mechanism,
   wherein the control unit includes
      a display control unit that displays an image of a medium which is read by the image reading apparatus and in which multifeed is detected by the multifeed detecting mechanism, and a multifeed detected portion which is detected by the multifeed detecting mechanism and is a portion of the medium, on the display unit, the multifeed detected portion being displayed on the image, and
   the display control unit displays, on the display unit, a multifeed detection check screen including an image display area to display the image and the multifeed detected portion and a variable display area to variably display a multifeed detection range including an area or a length in which the multifeed detected by the multifeed detecting mechanism is enabled or disabled.

2. The image displaying apparatus according to claim 1, wherein the control unit further includes
   a setting unit that causes the area or the length to be set by operating the multifeed detection range, and
   a reflecting unit that reflects the area or the length set by the setting unit in the multifeed detected portion displayed on the image display area.

3. The image displaying apparatus according to claim 2, wherein the display control unit characteristically displays the multifeed detected portion detected in the area or the length, set by the setting unit, in which the multifeed detection is disabled, on the image display area.

4. The image displaying apparatus according to claim 2, wherein the display control unit notifies, after the image reading apparatus finishes reading, that the multifeed detected portion is detected in the area or the length, set by the setting unit, in which the multifeed detection is disabled.

5. The image displaying apparatus according to claim 1, wherein the multifeed detection check screen further includes a display area to display a length of the medium and a difference between the length of the medium and a preset reference length, and the display control unit displays the length of the medium and the difference on the display area.

6. The image displaying apparatus according to claim 1, wherein the control unit further includes
   a deleting unit that deletes the image, and
   a rereading unit that causes the image reading apparatus to reread the medium.

7. An image displaying method implemented by a control unit of an image displaying apparatus that includes the control unit and a display unit and is connected to an image reading apparatus including a multifeed detecting mechanism, the image displaying method comprising:
   a display controlling step of displaying an image of a medium which is read by the image reading apparatus and in which multifeed is detected by the multifeed detecting mechanism, and a multifeed detected portion which is detected by the multifeed detecting mechanism and is a portion of the medium, on the display unit, the multifeed detected portion being displayed on the image,
   wherein the display control step displays, on the display unit, a multifeed detection check screen including an image display area to display the image and the multifeed detected portion and a variable display area to variably display a multifeed detection range including an area or a length in which the multifeed detected by the multifeed detecting mechanism is enabled or disabled.

8. A non-transitory tangible computer readable medium having instructions for a control unit of an image displaying apparatus that includes the control unit and a display unit and is connected to an image reading apparatus including a multifeed detecting mechanism, the instructions, when executed, causing the control unit to perform:
   a display controlling step of displaying an image of a medium which is read by the image reading apparatus and in which multifeed is detected by the multifeed detecting mechanism, and a multifeed detected portion which is detected by the multifeed detecting mechanism and is a portion of the medium, on the display unit, the multifeed detected portion being displayed on the image,
   wherein the display control step displays, on the display unit, a multifeed detection check screen including an image display area to display the image and the multifeed detected portion and a variable display area to variably display a multifeed detection range including an area or a length in which the multifeed detected by the multifeed detecting mechanism is enabled or disabled.

* * * * *